Patented July 27, 1937

2,088,331

UNITED STATES PATENT OFFICE 2,088,331

FOOD FOR INFANTS AND THE LIKE AND THE PROCESS OF MAKING SAME

Günther Malyoth, Munich, Germany, assignor to Allgäuer Alpenmilch Aktiengesellschaft, Biessenhofen, Germany No Drawing. Application March 5, 1934, Serial No. 714,101. In Germany March 7, 1933

13 Claims. (Cl. 99—27)

This invention relates to a novel food product and the process of making same. More particularly, the food product of my invention is intended as an article of nutrition which in one form consists of a special kind of sugar and in another form consists of a mixture of said special kind of sugar with dry milk.

Several processes are in practical use for making nutritious sugar mixtures from starch and other polysaccharides. The commercially available products obtained by these processes may be divided into the following two principal classes: First, products which while containing small quantities of glucose consist essentially of maltose and dextrin (about 50% of maltose and about 50% of dextrin), frequently with the addition of a small quantity of sodium chloride, and, secondly, products which while containing extremely small quantities of maltose and dextrin consist essentially of glucose.

When starch, in particular, is disintegrated or converted in the manner heretofore usual, that is with the aid of ferments present in germinating cereals, dextrin-maltose mixtures are obtained in which the maltose is present essentially in the $\beta$-form.

Stated generally, my invention is based on the discovery that when starch is disintegrated or converted in the human body with the aid of the amylase of the body, mainly of the pancreas, the starch molecule is attacked in a direction, to produce $\alpha$-maltose and a dextrin body opened towards $\alpha$, that is a dextrin body which is of a composition different from that obtained when the starch is disintegrated in the direction towards $\beta$-maltose. In accordance with this discovery I accomplish the disintegration of the starch into a sugar mixture like or similar to that obtained by the disintegration taking place in the human organism. While in the human body the starch is disintegrated by the amylase of the pancreas, according to my invention the starch is disintegrated by means of a mixture of ferments obtained from a species of aspergilli into $\alpha$-maltose and the co-relevant dextrin body, said dextrin body being opened towards $\alpha$.

Another especial advantage of the process of my invention is that the mixture of ferments from aspergillus oryzae, not only acts upon the amylose, which is the pure starch contained in the interior of the starch grain, but also disintegrates the amylopectin enveloping said amylose in concentric layers. Amylopectin is a substance similar to glycogen organically bound to phosphoric acid, and upon disintegration of amylopectin important compounds of phosphorous are liberated, which may be made available as a nutriment for the human organism. With the disintegrating process heretofore in use the amylopectin, which is resistant to the action of ferments, cannot be disintegrated, because the action of the germinating cereals in splitting off the semi-cellulose and pectin is quite small, the presence of genuine cellulose being doubtful and a phosphatase action being completely absent.

According to my invention, the disintegration is effected as follows: As initial material I use potato-starch or starch from wheat, oats or other cereals swelled in water. Crystallized citric acid is now added to the swelled material for the dual purpose of attaining the optimum pH=5.0 necessary for the disintegration by ferments and of preventing disintegration of the produced $\alpha$-bodies into $\beta$-bodies. Thereupon a mixture of ferments obtained from aspergillus oryzae is added. Water is heated to 65° C. in a boiler equipped with an agitator and the starch ferment mixture made up in the manner above described is continuously supplied to said boiler while said agitator is operated, the temperature in the boiler being kept at 65° C. Disintegration of the starch which begins immediately is continued, at the same time maintaining said temperature of 65° C. until the proper ratio of dextrin and maltose, in the present case 50% dextrin and 50% maltose, is attained. Thereupon the ferment is destroyed by heating the mass to 80° C. in order to discontinue disintegration. The hot dark sugar solution is now filtered by means of a filter press and concentrated in a vacuum at low temperature into a semi-fluid mass and further dried in the vacuum at a temperature of about 50° C. under special conditions. The brittle dry product is now mechanically broken up and finely ground.

In view of the fact that the human digestive system acts in a pronouncedly selective manner in resorbing sugars, a sugar made according to the present invention is especially suitable for human nutrition. Moreover, sugar can not properly assist a human or animal body because of its youth or age or infirmity is unable to disintegrate starch, unless said sugar is such that the natural disintegration taking place in the animal or human organism may occur. In consequence of this, the mixture of sugars made by the process of my invention will be most suitable for the nutrition of infants and small children, but may of course also be used with advantage by invalids or persons of any age either as a nutriment or in order to supplement nutrition during convalescence.

Instead of the ferment aforementioned other ferments may be used with the same effect; also, disintegration may be effected although in less perfect manner by pancreatic amylase.

The sugar mixture made by my process may also be used with advantage in combination with dry milk in order to produce a dry milk nutriment. It is of especial advantage if the acidified sugar solution obtained by my process is not dried or concentrated but immediately mixed with the milk in undried or only partly dry condition. The resulting mixture is now dried by heat in any convenient manner. This latter process has the special advantage that the milk particles, being acidified by addition of the acidified sugar solution, will be far better suspended and distributed, if they are again dissolved after drying.

Mixing of the milk with the sugar solution and proper distribution of the two substances may further be accelerated by the addition of pectins or pectin-like substances, preferably to said sugar solution, which thus will assume the consistency of a paste or jelly. In this manner a highly nutritious dry milk may be obtained with its ingredients easily soluble and in a state of fine suspension.

I claim:

1. As a new article of manufacture, a food product being free from active ferments and comprising α-maltose and a dextrin body opened up in α-direction.

2. As a new article of manufacture, a food product being free from active ferments and comprising approximately equal amounts of α-maltose and a dextrin body opened up in α-direction.

3. As a new article of manufacture, a food product being free from active ferments and comprising α-maltose, a dextrin body opened up in α-direction, and powdered milk.

4. As a new article of manufacture, a food product being free from active ferments and comprising α-maltose, a dextrin body opened up in α-direction, and powdered milk, said maltose and dextrin body being approximately equal in quantity.

5. A process of making a food product containing a mixture of sugar, said process comprising the steps of adding a ferment mixture acting in α-direction selected from the class consisting of of aspergillus oryzae and pancreatic amylase to starch, whereby the starch molecules are disintegrated, and destroying said ferment mixture during the disintegration to form a product, which contains substantially α-maltose and a dextrin body opened up in α-direction.

6. A process of making a food product containing a mixture of sugar, said process comprising the steps of adding a ferment mixture acting in α-direction selected from the class consisting of aspergillus oryzae and pancreatic amylase to starch, whereby the starch molecules are disintegrated, and destroying said ferment mixture during the disintegration to form a product, which contains substantially α-maltose, a dextrin body opened up in α-direction and compounds of phosphorus formed by the disintegration of the amylopectin of the starch.

7. A process of making a food product containing a mixture of sugar, said process comprising the steps of adding citric acid and a ferment mixture acting in α-direction selected from the class consisting of aspergillus oryzae and pancreatic amylase to starch, whereby the starch molecules are disintegrated, and destroying said ferment mixture during the disintegration to form a product, which contains substantially α-maltose, a dextrin body opened up in α-direction and compounds of phosphorus formed by the disintegration of the amylopectin of the starch.

8. A process of making a food product containing a mixture of sugar, said process comprising the steps of adding a ferment mixture acting in α-direction selected from the class consisting of aspergillus oryzae and pancreatic amylase to starch, heating the resulting mixture of ferment and starch to about 65° C., whereby the starch molecules are disintegrated, and destroying said ferment mixture during the disintegration to form a product, which contains substantially α-maltose and a dextrin body opened up in α-direction.

9. A process of making a food product containing a mixture of sugar, said process comprising the steps of adding a ferment mixture acting in α-direction selected from the class consisting of aspergillus oryzae and pancreatic amylase to starch, heating the resulting mixture of ferment and starch to about 65° C., whereby the starch molecules are disintegrated, and destroying said ferment mixture by heating to about 80° C. during the disintegration to form a product, which contains substantially α-maltose and a dextrin body opened up in α-direction.

10. A process of making a food product containing a mixture of sugar, said process comprising the steps of swelling up starch, adding crystallized citric acid to the tumescent starch, thereupon adding a ferment mixture acting in α-direction selected from the class consisting of aspergillus oryzae and pancreatic amylase, heating the resulting mixture of ferment and starch to about 65° C., whereby the starch molecules are disintegrated, and destroying said ferment mixture by heating to about 80° C. during the disintegration to form a product, which contains substantially α-maltose, a dextrin body opened up in α-direction and compounds of phosphorus formed by the disintegration of the amylopectin of the starch.

11. A process of making a food product containing a mixture of sugar, said process comprising the steps of adding a ferment mixture acting in α-direction selected from the class consisting of aspergillus oryzae and pancreatic amylase to starch, whereby the starch molecules are disintegrated, destroying said ferment mixture during the disintegration to form a product, which contains substantially α-maltose and a dextrin body opened up in α-direction, heating and filtering said mixture of sugar, and drying it in vacuo at a temperature of about 50° C.

12. A process of making a food product containing a mixture of sugar, said process comprising the steps of adding a ferment mixture acting in α-direction selected from the class consisting of aspergillus oryzae and pancreatic amylase to starch, whereby the starch molecules are disintegrated, destroying said ferment mixture during the disintegration to form a product, which contains substantially α-maltose and a dextrin body opened up in α-direction, adding milk, and drying the liquid thus obtained.

13. A process of making a food product containing a mixture of sugar, said process comprising the steps of adding citric acid and a ferment mixture acting in α-direction selected from the class consisting of aspergillus oryzae and pancreatic amylase to starch, whereby the starch molecules are disintegrated, destroying said ferment mixture during the disintegration to form a product, which contains substantially α-maltose and a dextrin body opened up in α-direction, adding pectins, mixing the resulting paste or jelly with milk partly concentrated by evaporation, and drying the liquid thus obtained.

GÜNTHER MALYOTH.